Aug. 4, 1959 S. A. RASMUSSEN 2,898,090
SAFETY FENCE FOR MOTORWAYS
Filed Jan. 13, 1958 3 Sheets-Sheet 1
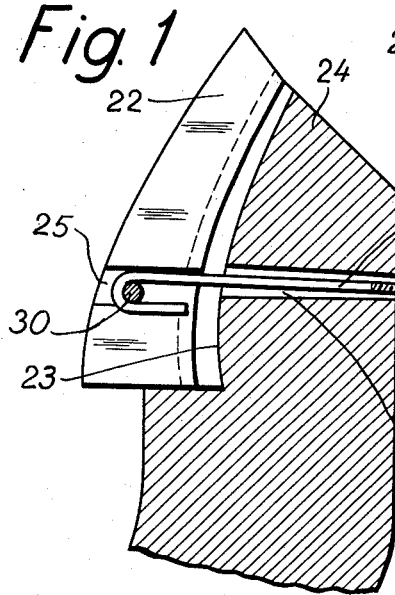
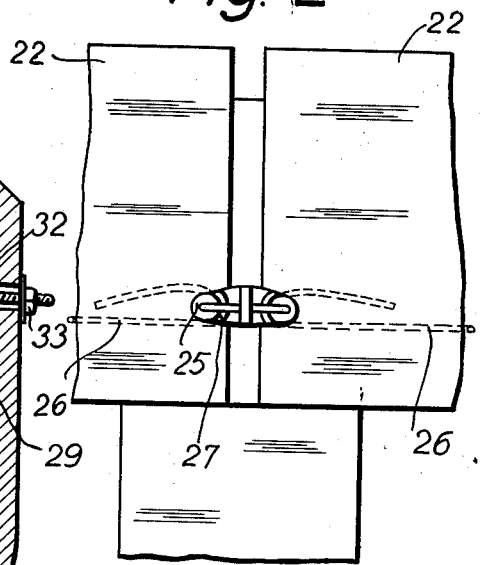
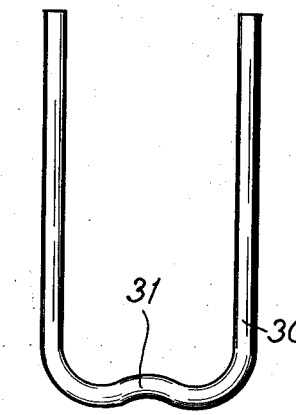
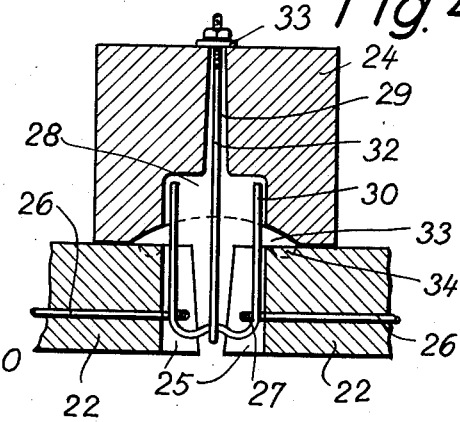
INVENTOR
SVEND AAGE RASMUSSEN
By Mason, Fenwick & Lawrence
Attorneys

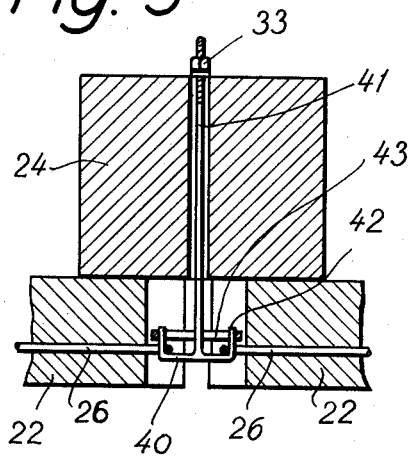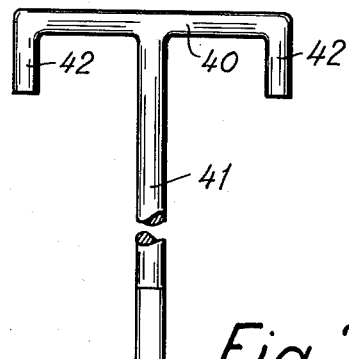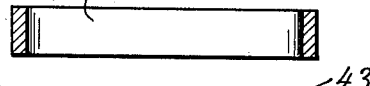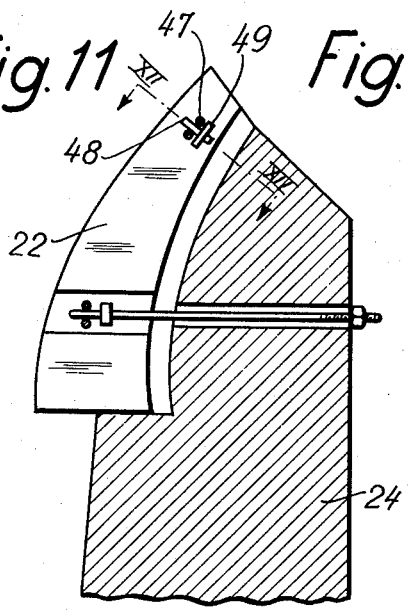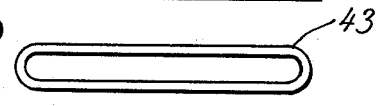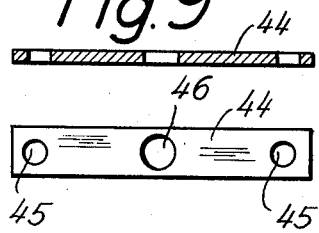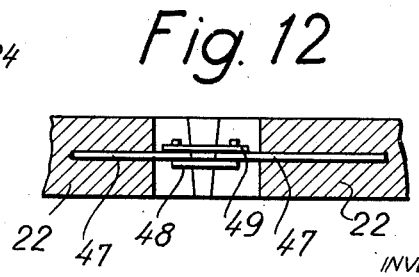

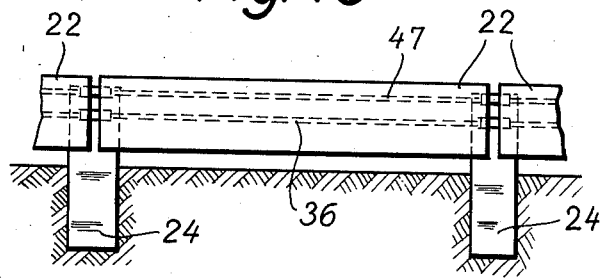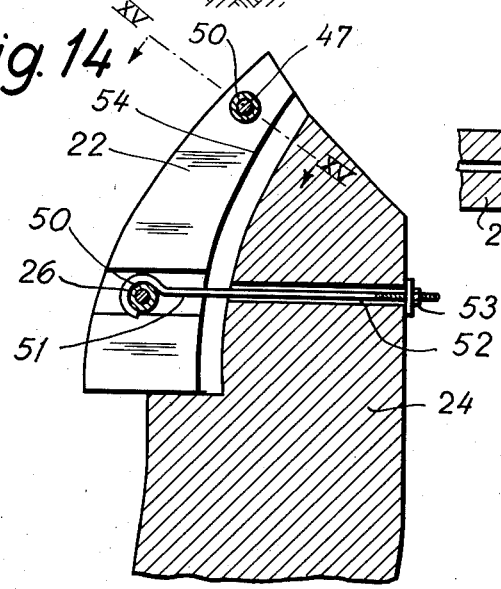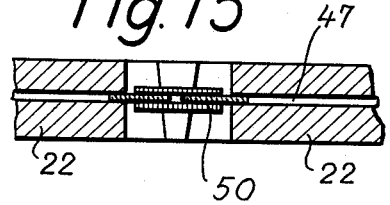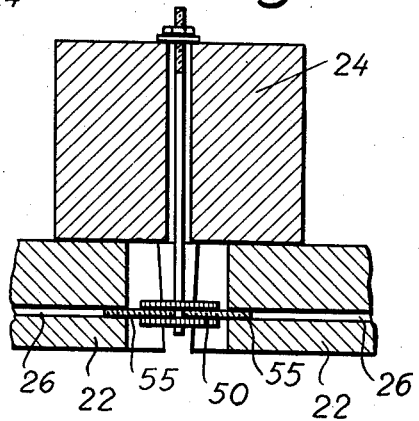

United States Patent Office 2,898,090
Patented Aug. 4, 1959

2,898,090
SAFETY FENCE FOR MOTORWAYS
Svend Aage Rasmussen, Silkeborg, Denmark
Application January 13, 1958, Serial No. 708,570
Claims priority, application Denmark October 21, 1957
8 Claims. (Cl. 256—13.1)

The invention relates to a safety fence for motorways, consisting of oblong horizontal reinforced concrete plates which are attached to substantially vertical pillars embedded or in other manner fastened along the edge of the roadway.

It is known to provide direct connection between the individual plates of a fence of the aforesaid kind, so that tensile forces may be transmitted from plate to plate. The known designs provide no strong fence since bolts are used which are received in holes in the concrete plates or cast in the pillars, so that these plates crack or are crushed on collision.

Furthermore, the known assembly means are not very suitable in regard to a rotational and secure attachment of the plates to the pillars with possibly of removal of the plates.

It is the object of the invention to provide a safety fence of the aforesaid kind having none of the drawbacks referred to and which by means of simple devices can be securely fastened to the pillars and be dismantled without injuring the essential parts of the fence.

An essential feature of the fence according to the invention is that the reinforcements in the plates at the ends of same project outside the concrete walls of the plates, and are interconnected by means of readily releasable engagement means which are connected with the pillar by special readily removable engagement means.

The result obtained is that the plates of the fence will constitute a continuous iron chain which is supported by the pillars, the said pillars having, by the way, not to transmit any tensile forces between the plates but are acting solely as carrying and supporting members for the plates.

Various embodiments of a safety fence according to the invention will now be described with reference to the drawing, in which Figure 1 is a vertical sectional view through a pillar of the safety fence of the present invention, showing the end of one of the plates of the fence in elevation;

Figure 2 is a fragmentary elevational view of a joint formed between adjacent plates of the fence at a pillar;

Figure 3 is an enlarged plan view of a clamp member for holding the plates on the seat in the highway facing side of the pillar;

Figure 4 is a horizontal sectional view through the joint shown in Figure 2, showing the clamping members in place;

Figure 5 is a horizontal sectional view through a joint formed between adjacent plates and a modified pillar and showing modified clamping members;

Figure 6 is an enlarged plan view of the modified clamping member shown in Figure 5;

Figure 7 is an enlarged horizontal sectional view of the keeper ring shown in Figure 5;

Figure 8 is a front elevational view of the keeper ring shown in Figure 7;

Figure 9 is a cross sectional view of a keeper plate or modification of the keeper shown in Figure 8;

Figure 10 is a front elevation of the keeper plate shown in Figure 9;

Figure 11 is a vertical sectional view through the pillar showing the end of a modified plate of the fence in elevation;

Figure 12 is a cross sectional view taken on the line XII—XII of Figure 11;

Figure 13 is a front elevation of a section of still another modified fence in which threaded sleeves connect the reinforcing bars, the two vertically spaced reinforcing bars of the plates being shown in dotted lines;

Figure 14 is a vertical sectional view through a pillar of the safety fence shown in Figure 13, showing the end of one of the plates of the modified fence in elevation;

Fence 15 is a cross-sectional view taken on the line XV—XV of Figure 14; and

Figure 16 is a horizontal sectional view through one of the joints shown in Figure 13 taken on a line through the lower reinforcement bar.

In the embodiment disclosed in Figures 1–4 the longitudinal plates 22 of the fence are of oblong cross-section and are mounted in a recess 23 of a pillar 24. Each of the plates 22 has a transverse groove 25, into which the longitudinal reinforcement bar 26 projects and forms an eye 27. The said eyes 27 in two adjacent plates 22 are located in extension of each other and spaced apart as shown in Figures 2 and 4. Opposite the grooves 25 the pillar 24 has a depression 28 which communicates with the back of the pillar by means of a hole 29.

Through the two eyes 27 is passed a hairpin-shaped clamp 30 (Figure 4), the two branches of which are received in the cavity 28. A bent section 31 of the central part of the clamp is engaged by a hooked bolt 32 extending through the hole 29 and provided with a nut 33 on the back of the pillar.

It will be evident from the figures, more particularly Figure 4, that the clamp 30 constitutes the connecting member between the reinforcement bars 26 and further serves to retain the plates 22 against the pillar 24. Since the clamp conforms roughly to the cavity 28, the walls of same will prevent the branches of the clamp from spreading.

The hairpin-shaped clamp 30 serves partly as connecting member, so that tensile forces may be transmitted from one plate 22 to the other through the clamp 30. This clamp serves furthermore to prevent displacement of the plates 22 in relation to the pillar 24 and interlocks the plates. The bolt 32 serves to draw the plates towards the pillar and at the same time tightens the hairpin-shaped clamp.

As will appear from the foregoing, the special design of the cavity, the eyes and the clamp and the hooked bolt produces a combined effect providing an effective and suitable attachment between the two plates and the pillar, despite the simple means used.

After assembly, the space between the plates as well as the cavity are grouted and as will be seen, more particularly from Figure 4, there are a number of cavities 33 and 34 in the pillar 24 and the plates 22 which after grouting form guiding members between the parts.

When dismantling, the grout is chiseled off, and the bolt 32 is loosened and removed, after which the clamp may be withdrawn so that two plates 22 can be removed from each other.

Instead of a clamp and a loose clamping bolt these parts may be united in one piece as shown in Figure 6, in which the upper part 40 of a T-shaped bolt forms the clamp corresponding to the clamp 30, whereas the central part 41 constitutes the clamping bolt corresponding to the bolt 32. The combined clamp and clamping bolt is provided with parts 42 extending parallel with the part 41 and which as shown in Figure 5 embrace the bent parts of the reinforcement irons 26 in the same manner as the branches of the clamp 30 according to Figure 4. Instead of the cavity 28 whose walls facing each other form the assembly of the branches of the clamp there is used a flat ring 43 as indicated in Figures 7 and 8 and which as shown in Figure 5 is placed in such manner that it surrounds the parts 42 and prevents these from spreading.

By means of the ring 43 is provided a closed link which has the same effect as a chain link, whereby the two reinforcement bars 6 and the said chain link will act as a continuous chain transmitting the stresses to which the fence is exposed by the one fence plate 22 on the other, an angular movement of one plate in relation to the other being made possible. In case of collision the impact against the said fence plate will be transmitted to the other plates just as in the action of a chain, whereby the whole chain will yield and push the pillar 24 back, such part of the pillar as is embedded in the ground being loosened by the impact. This means a tough resistance to the impact, which, in the first place, is convenient in view of the colliding vehicle and, in the second place, causes the least harm to the various components of the safety fence so that serious damage may be avoided in many cases.

Instead of a ring 43 there may be used a piece of flat iron 44 as shown in Figures 9 and 10. The said flat iron has three holes of which two 45 serve to receive the parts 42, whereas the central one 46 serves for receiving the through-going part 41 of the T-shaped bolt shown in Figure 6. The flat iron 44 is placed in the same manner as the ring according to Figure 5.

Figure 11 shows the provision of reinforcement bars 47 at the upper end of the fence plates 22, the said bars 47 being assembled by means of a chain link in the same manner as the assembly shown in Figure 5. The assembly at the upper end of the plate 22 is shown in Figure 12, from which it appears that a clamp 48 is used whose branches extend through bent eyes of the reinforcement bars 47, being held together by means of an assembly member 49 consisting of a flat iron corresponding to that shown in Figure 9, but having two holes instead of three.

In the embodiment according to Figures 11 and 12 is provided a special powerful and tough assembly, which despite the use of two reinforcement bars affords possibility of angular movement and chain action between the plates.

In the embodiment according to Figure 13–16 abutting end parts of the reinforcement bars are provided with left-hand and right-hand screwthreading 55, respectively, and they are assembled by means of a threaded socket 50 likewise with right-hand and left-hand screwthreading in its two ends so that the socket may be screwed onto the ends of the reinforcement bars as shown in Figures 15 and 16.

Around the socket 50 on the lower lying reinforcement bar 26 (Figure 14) is placed a hooked bolt 51 extending through a hole 52 in the pillar 24 and provided with a nut 53 outside the pillar. By means of the said nut the two fence plates may be drawn close to a substantially vertical, curved surface 54 of the pillar.

As will be seen from Figure 14, the upper part of the fence plate is provided with reinforcement bars which are likewise connected by means of a socket, but these bars may be dispensed with, if desired, so that only the lower reinforcement bar 26 is used.

Both of the sockets and the hooked bolt are disposed in a cavity in the two abutting fence plates, and the said cavity is filled out with concrete after mounting the plates so that the plates obtain a continuous smooth surface towards the road. When the fence is dismantled, for example, after rupture of the fence, the concrete in the cavity is chiseled off and the assembly means described may then easily be removed so that one or more plates, if necessary, can be replaced.

What I claim and desire to secure by Letters Patent is:

1. A safety fence for highways comprising, a plurality of spaced pillars for mounting at the edge of said highway, said pillars having a highway facing side, a plate receiving seat on said highway facing side, a plurality of longitudinally extending concrete plate members bridging the space between said pillars, said plate members being joined in end-to-end relation to form joints at said plate receiving seats of said pillars, each of said plate members having a transverse horizontal groove across each of its ends, a longitudinally extending reinforcing bar imbedded in each of said plate members having ends extending into said grooves respectively, a stress relieving link member for each of said joints and having a pair of ends, means for connecting said ends of said stress relieving link members to said ends of said reinforcement bars of adjacent plate members respectively to connect said plate members, said pillars having a passageway extending transversely through said pillar from said seat on said highway facing side, a bolt member having one end threaded, the other end of said bolt member being operatively coupled with said stress relieving link to form a holding means for said plate members, said threaded end of said bolt extending through said passageway of said pillar, and a nut engaging said threaded end of said bolt member to hold said plate members on said plate receiving seats of said pillar.

2. A safety fence for highways comprising, a plurality of spaced pillars for mounting at the edge of said highway, said pillars having a highway facing side, a plate receiving seat on said highway facing side said plate receiving seat having a depression therein, a plurality of longitudinally extending concrete plate members bridging the space between said pillars, said plate members being joined in end-to-end relation to form joints at said plate receiving seats of said pillars, each of said plate members having a transverse horizontal groove across each of its ends, a longitudinally extending reinforcing bar imbedded in each of said plate members having ends extending into said grooves respectively, said ends of said reinforcing bars being formed into eyes, a U-shaped stress relieving link having one leg passing through the eye of the respective reinforcing bars of adjacent plate members and extending into said depression, said pillars having a passageway extending transversely through said pillar from said seat on said highway facing side, a bolt member having one end threaded, the other end of said bolt member being operatively coupled with said stress relieving link to form a holding means for said plate members, said threaded end of said bolt extending through said passageway of said pillar, and a nut engaging said threaded end of said bolt member to hold said plate members on said plate receiving seats of said pillar.

3. A safety fence for highways comprising, a plurality of spaced pillars for mounting at the edge of said highway, said pillars having a highway facing side, a plate receiving seat on said highway facing side, a plurality of longitudinally extending concrete plate members bridging the space between said pillars, said plate members being joined in end-to-end relation to form joints at said plate receiving seats of said pillars, each of said plate members having a transverse horizontal groove across each of its ends, a longitudinally extending reinforcing bar imbedded in each of said plate members having ends extending into said grooves respectively, said ends of said reinforcing bars being formed into eyes, a T-shaped force relieving link having ends of the arms of said T formed into hooks, and the end of the leg of said T threaded, said hooks on the arms of said T passing through the eye of the respective reinforcing bars of adjacent plate members to connect said plate members, said pillars having a passageway extending transversely through said pillar from said seat on said highway facing side, said threaded end of said leg of said T extending through said passageway of said pillar, and a nut engaging said threaded end of said leg of said T to hold said plate members on said plate receiving seats of said pillars.

4. In a fence for highways as claimed in claim 3, a keeper engaging the hooks on the arms of said T.

5. A safety fence for highways comprising, a plurality of spaced pillars for mounting at the edge of said highway, said pillars having a highway facing side, a plate receiving seat on said highway facing side, a plurality of longitudinally extending concrete plate member bridging the space between said pillars, said plate members being joined in end-to-end relation to form joints at said plate receiving seats of said pillars, each of said plate members having a transverse horizontal groove across each of its ends, a longitudinally extending reinforcing bar imbedded in each of said plate members having ends extending into said grooves respectively, said ends of said reinforcing bars being screw threaded, an internally screw threaded stress relieving link threadedly engaging the respective ends of said reinforcing bars of adjacent plate members, said pillar having a passageway extending transversely through said pillar from said seat on said highway facing side, a bolt member having one end threaded, the other end of said bolt member being operatively coupled with said stress relieving link to form a holding means for said plate members, said threaded end of said bolt extending through said passageway of said pillar, and a nut engaging said threaded end of said bolt member to hold said plate members on said plate receiving seats of said pillar.

6. A safety fence for highways comprising, a plurality of spaced pillars for mounting at the edge of said highway, said pillars having a highway facing side, a plate receiving seat on said highway facing side, a plurality of longitudinally extending concrete plate members bridging the space between said pillars, said plate members being joined in end-to-end relation to form joints at said plate receiving seats of said pillars, each of said plates having vertically spaced apart upper and lower transverse horizontal grooves across each of its ends, upper and lower vertically spaced apart longitudinally extending reinforcement bars imbedded in each of said plate members, an end of said upper reinforcement bar extending into each of said upper horizontal grooves respectively, an end of said lower reinforcement bar extending into each of said lower horizontal grooves respectively, said ends of said reinforcing bars being formed into eyes, a T-shaped stress relieving link having ends of said T formed into hooks, and the end of the leg of said T threaded, said hooks on the arms of said T passing through the eye of the respective lower reinforcing bars of adjacent plate members to connect said plate members, each of said pillars having a passageway extending transversely through said pillar from said seat on said highway facing side, said threaded end of said leg of said T extending through said passageway of said pillar, a nut engaging said threaded end of said leg of said T to hold said plate member on said plate receiving seat of said pillar, a U-shaped stress relieving link, and each leg of the U-shaped stress relieving link passing through the eyes of the upper reinforcement bars of adjacent plate members.

7. In a safety fence for highways as claimed in claim 6, a keeper embracing the legs of the U-shaped stress relieving link.

8. A safety fence for highways comprising, a plurality of spaced pillars for mounting at the edge of said highway, said pillars having a highway facing side, a plate receiving seat on said highway facing side, a plurality of longitudinally extending concrete plate members bridging the space between said pillars, said plate members being joined in end-to-end relation to form joints at said plate receiving seats of said pillars, each of said plates having vertically spaced apart upper and lower transverse horizontal grooves across each of its ends, upper and lower vertically spaced apart longitudinally extending reinforcement bars imbedded in each of said plate members, an end of said upper reinforcement bar extending into each of said upper horizontal grooves respectively, an end of said lower reinforcement bar extending into each of said lower horizontal grooves respectively, said ends of said reinforcing bars being screw threaded, a stress relieving link having internally screw threaded ends engaging the respective ends of said lower reinforcement bars of adjacent plate members to connect said plate members, a bolt member having one end operatively coupled with said stress relieving link and having its other end screw threaded, each of said pillars having a passageway extending transversely through said pillar from said seat on said highway facing side, said threaded end of said bolt member extending through said passageway of said pillar, a nut engaging said threaded end of said bolt member to hold said plate members on said plate receiving seat of said pillar, and a second stress relieving link having internally screw threaded ends engaging said ends of said upper reinforcement bars.

References Cited in the file of this patent

UNITED STATES PATENTS

| | | |
|---|---|---|
| 910,950 | Noll | Jan. 26, 1909 |
| 1,280,632 | Auer | Oct. 8, 1918 |